(12) United States Patent
Moffatt

(10) Patent No.: US 6,918,671 B2
(45) Date of Patent: Jul. 19, 2005

(54) PROJECTOR AND METHOD

(75) Inventor: John Martin Moffatt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 82 days.

(21) Appl. No.: 10/618,217

(22) Filed: Jul. 11, 2003

(65) Prior Publication Data
US 2005/0007564 A1 Jan. 13, 2005

(51) Int. Cl.[7] ............................................. G03B 21/14
(52) U.S. Cl. ..................................... 353/82; 352/134
(58) Field of Search ........................... 352/134; 353/82, 353/71, 94; 359/629, 638

(56) References Cited

U.S. PATENT DOCUMENTS

| | | | |
|---|---|---|---|
| 1,230,369 A | * | 6/1917 | Bayers ........................ 353/82 |
| 2,041,194 A | * | 5/1936 | Lindenberg ................... 353/82 |
| 2,120,596 A | * | 6/1938 | Franklin ...................... 353/82 |
| 3,126,786 A | | 3/1964 | Appeldon |
| 3,293,807 A | * | 12/1966 | Ramsell ....................... 353/82 |
| 3,856,388 A | * | 12/1974 | Younger ...................... 353/82 |
| 4,638,470 A | | 1/1987 | Connell et al. |
| 5,333,072 A | | 7/1994 | Willett |
| 5,418,583 A | | 5/1995 | Masumoto |
| 5,889,614 A | | 3/1999 | Cobben et al. |
| 6,089,718 A | | 7/2000 | Hashizume |
| 6,273,567 B1 | | 8/2001 | Conner et al. |
| 6,309,073 B1 | | 10/2001 | Nakayama et al. |
| 6,473,115 B1 | | 10/2002 | Harman |
| 6,505,940 B1 | | 1/2003 | Gotham et al. |
| 6,773,113 B2 | * | 8/2004 | Muehlhoff et al. ............ 353/82 |

* cited by examiner

*Primary Examiner*—Christopher Mahoney

(57) ABSTRACT

Disclosed herein are exemplary embodiments of a projector having multiple projection paths and related methodology.

9 Claims, 4 Drawing Sheets

PROJECTOR AND METHOD

BACKGROUND

Projectors are devices that project images onto surfaces where they can be viewed. Often these projectors are used to project images onto walls of a room to assist with a presentation. This presentation may, for example, occur when a presenter is presenting to an audience.

Conventional projectors project an image in one direction; this image is usually located on a wall that is behind the presenter (where it is visible to the audience, but not to the presenter). This location of the image requires the presenter to turn his/her back to the audience to view the visual.

SUMMARY

In one exemplary embodiment, a projector may include a housing defining an interior and an exterior; a first projection path extending from the interior to the exterior; a second projection path extending from the interior to the exterior; a light source positioned in the interior, the light source capable of creating a visual; wherein the first projection path is aligned with the light source; and wherein the second projection path is aligned with the light source.

BRIEF DESCRIPTION OF THE DRAWING

Illustrative embodiments are shown in Figures of the Drawing in which.

DETAILED DESCRIPTION

Figure 1:
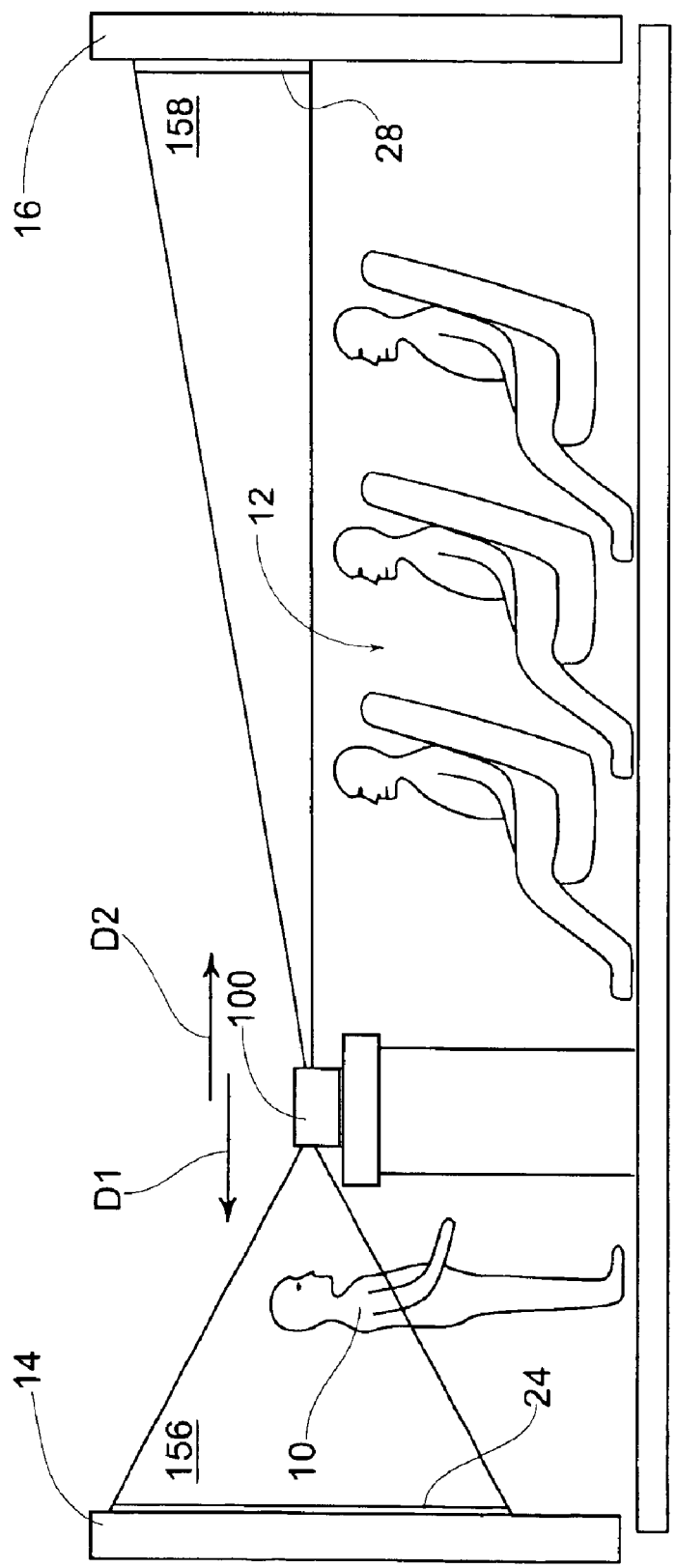
FIG. 1 is a side elevation view of a room in which a presentation of a visual is being given.

FIG. 1 illustrates an exemplary room in which a presentation may be given. With reference to FIG. 1, a presenter 10 is illustrated giving a presentation to a group 12 (sometimes referred to herein as an audience). As part of the presentation, the presenter 10 may use a projector 100 to display a first image 24 on a first wall 14 where the image 24 will be visible to the audience 12. The image 24 may, for example, include information such as bar graphs, tables or photographs.

It may be desirable for the presenter 10 to view the image being projected by the projector 100 during a presentation so that the presenter can, for example, determine and/or verify what image is being observed by the audience 12. As will be explained in further detail herein, the projector 100 is capable of projecting a second image 28 that may, for example, be identical to the first image 24 discussed above. With further reference to FIG. 1, the second image 28 may be projected on a second wall 16 which may, for example, be located opposite the first wall 14. In this manner, the presenter 10 may determine and/or verify what image is being observed by the audience 12 by viewing the image 28. Accordingly, it is not necessary for the presenter to turn his or her back on the audience in order to view the image being projected by the projector 100. The presenter, thus, may maintain substantial eye contact with the audience 12 during the entire presentation.

Having provided a description of an exemplary utilization of the projector 100, further details of the exemplary projector 100 will now be provided.

Figure 2:
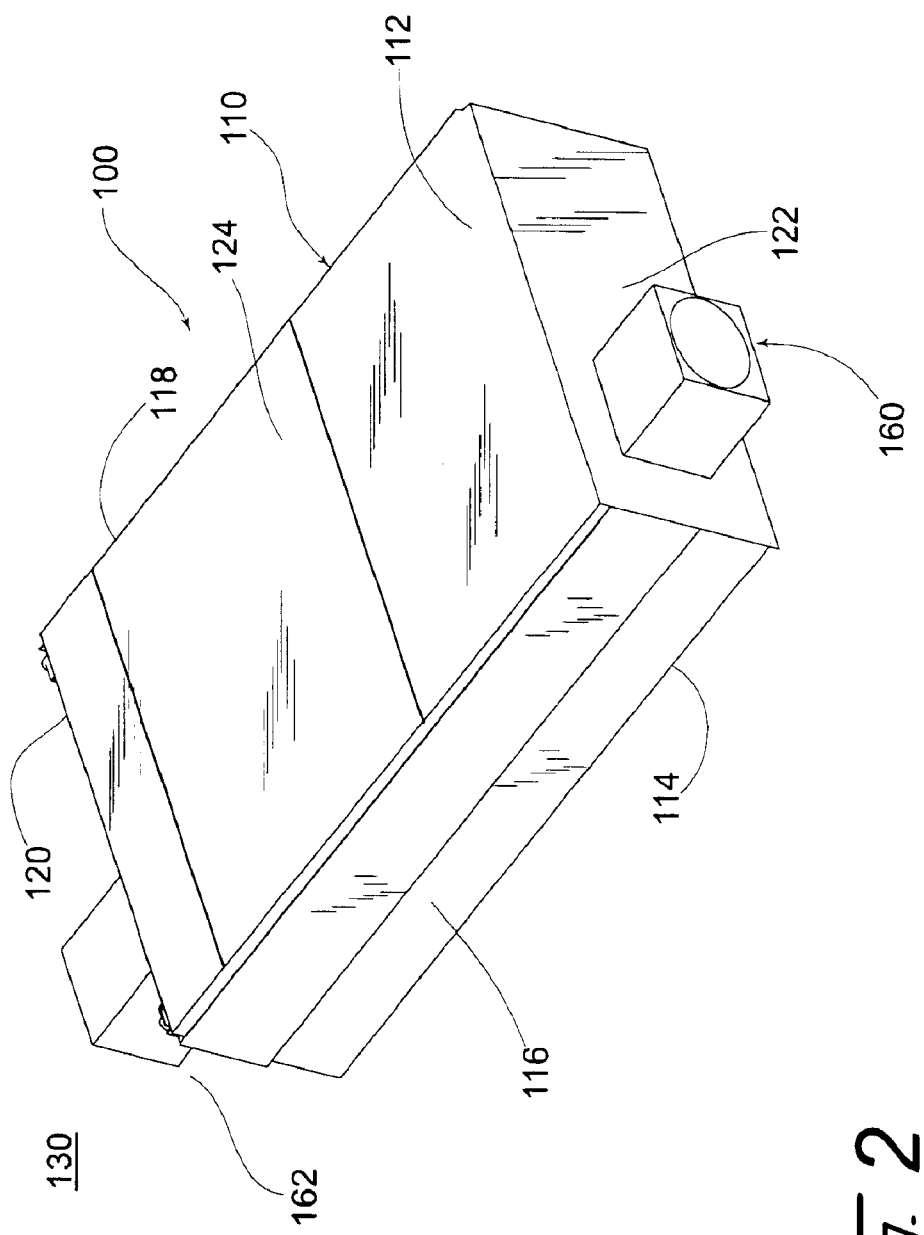
FIG. 2 is a perspective view of an exemplary projector.

FIG. 2 illustrates a perspective view of the projector 100 for creating and projecting images. With reference to FIG. 2, the projector 100 may be substantially encased by a chassis 110. The chassis 110 may be provided with a top panel 112, a bottom panel 114, a first side panel 116, a second side panel 118, a rear panel 120 and a front panel 122. The panels 112, 114, 116, 118, 120 and 122 of the chassis 110 may, for example, be formed in a generally parallelepiped configuration substantially separating an external portion 130 from an internal portion 132 (FIG. 3).

It is to be understood that terms such as 'front', 'back', 'top', 'bottom', 'horizontal', 'vertical', 'underneath' and the like are used herein for illustrative purposes only. In actual use, the projector 100 can be configured and/or used in almost any orientation, thus making terms such as 'front', 'back', 'top', 'bottom', 'horizontal', 'vertical', 'underneath', etc. relative to the orientation of the projector 100.

Figure 3:
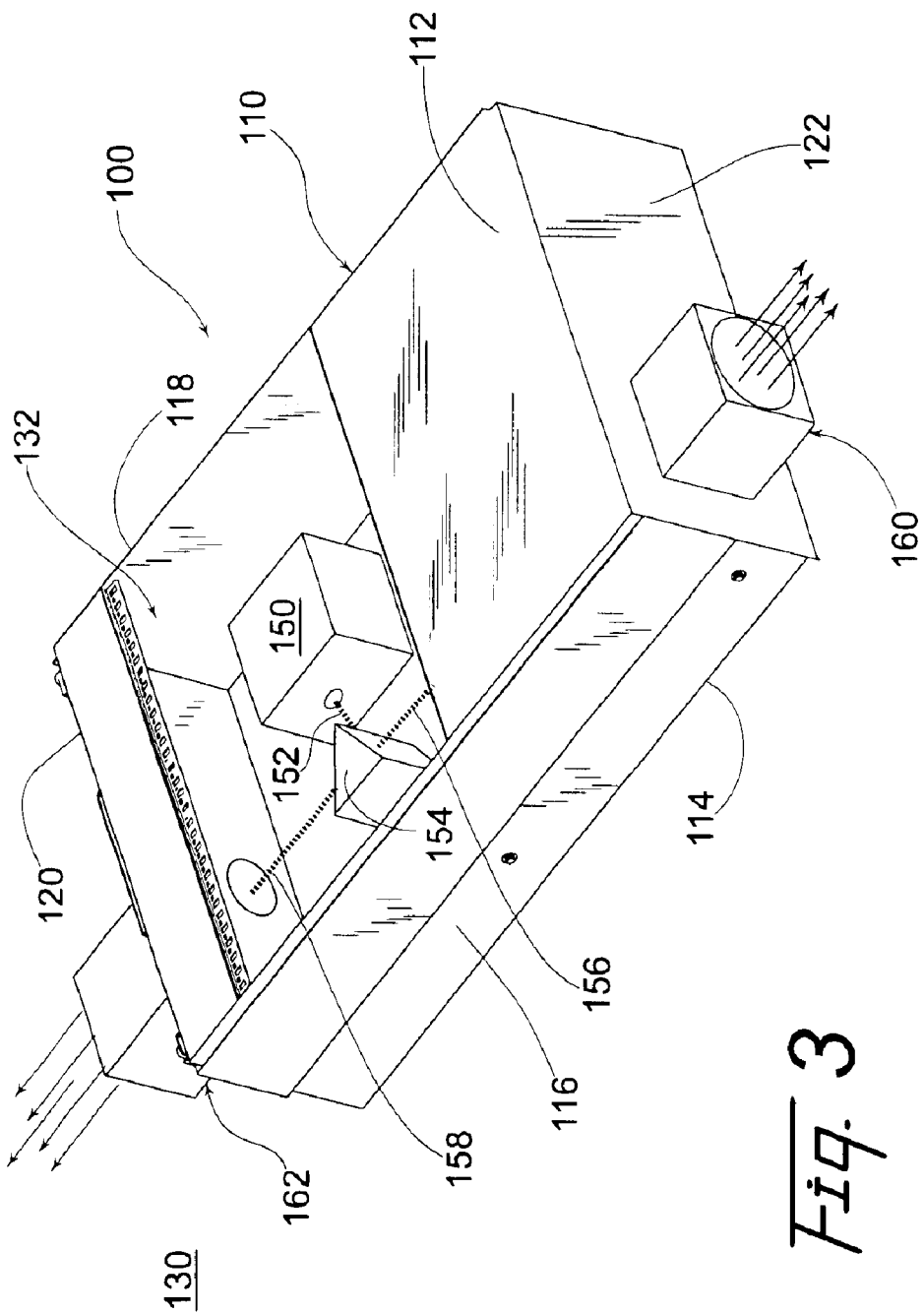
FIG. 3 is a perspective view of the exemplary projector of FIG. 2 with an access door removed therefrom.

FIG. 3 illustrates a perspective view of the projector 100 with an access door 124 (FIG. 2) removed therefrom to show the internal portion 132. With reference to FIG. 3, the projector 100 may be provided with various components for generating and projecting light. The projector may be provided with a light source 150, a beam splitter 154, a first lens 160 and a second lens 162. The light source 150 may generate light representative of a visual; this generated light may be referred to herein as a main beam 152. Various devices for generating light representative of visuals are well known in the art; for example, U.S. Pat. No. 6,309,073 for a PROJECTOR of Nakayama et al. and U.S. Pat. No. 6,089,718 for a PROJECTION DISPLAY DEVICE of Hashizume both of which are hereby specifically incorporated by reference for all that is disclosed therein. The beam splitter 154 may be any of a number of devices capable of breaking a light beam into two or more separate beams. Beam splitter 154 may, for example, be of the type having an optical window with a semi-transparent mirrored coating as described, for example, in U.S. Pat. No. 4,638,470 for an APPARATUS USING BEAM SPLITTER CUBE WITH SPECIFIC CHARACTERISTICS FOR READING INFORMATION RECORDED IN A MAGNETO-OPTIC MEDIUM of Connell et al., which is specifically incorporated by reference for all that is disclosed therein.

Main beam 152 generated by the light source 150 may be received by the beam splitter 154. The beam splitter 154 may cause the main beam 152 to be projected in two directions as a first projected beam 156 and a second projected beam 158. It should be noted that the first and second projected beams 156, 158 may be substantially similar to each other since they originate from the main beam 152.

With continued reference to FIG. 3, the projector 100 may be further provided with a first lens assembly 160 and a second lens assembly 162. The first lens assembly 160 may be positioned such that it provides a light path extending from the interior portion 132 to the exterior portion 130 through the front panel 122. This first lens assembly 160 may be configured to receive the first projected beam 156 emitted from the beam splitter 152. The second lens assembly 162 may be positioned such that it provides a light path extending from the interior portion 132 to the exterior portion 130 through the rear panel 120. This second lens assembly 162 may be configured to receive the second projected beam 158 emitted from the beam splitter 154.

Figure 4:
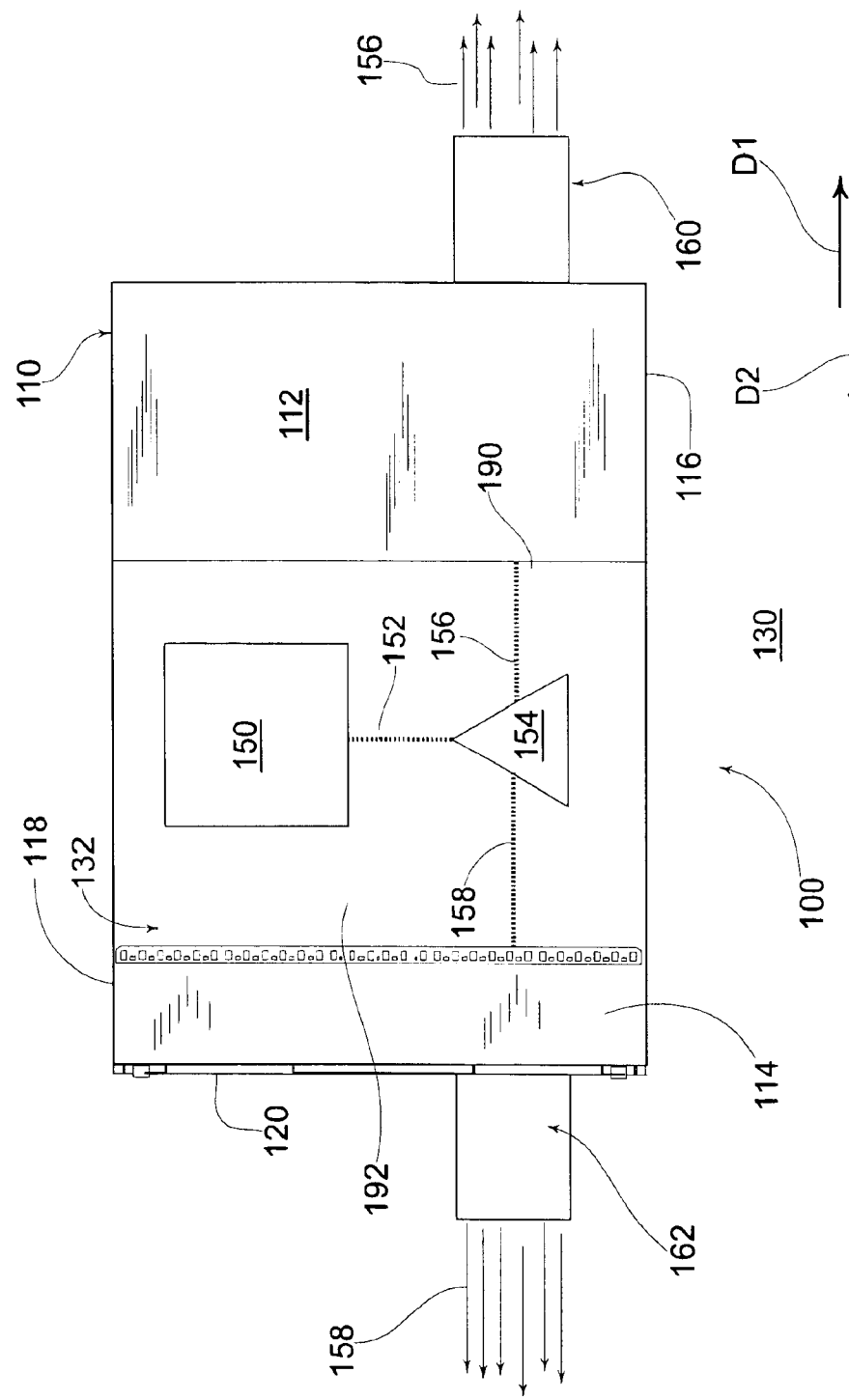
FIG. 4 is a top plan view of the exemplary projector of FIG. 3.

FIG. 4 illustrates a top plan view of the projector 100 with the access panel 124 (FIG. 2) removed therefrom. With reference to FIG. 4, the projector 100 may be configured such that the first and second projected beams 156, 158 emit from the projector 100 in substantially opposite directions (i.e. the first projected beam 156 travels in a first direction D1, while the second projected beam 158 travels in a second direction D2 that is opposite of first direction D1).

With reference to FIG. 1, the present projector 100 may be utilized to improve the quality of a presentation to the group 12 by allowing the presenter 10 to continue to look in the general direction D2 of the group 12 while referring to the second image 28 projected on the second wall 16. This eliminates the need for the presenter 10 to look at the first image 24 projected onto the first wall 14 (which would require the presenter 10 to turn away from the group 12).

Various alternative embodiments have been contemplated. The second projected beam 158, for example, may be emitted from the projector from another panel of the chassis 110 such as the first and/or second side panels 116, 118. By projecting the second projected beam 158 from another panel of the chassis 110, the second image 28 may be imaged onto another wall in the room. This second projected beam 158 may be selected by manually adjusting the orientation of the beam splitter 154 to result in the second projected beam 158 being emitted, for example, from the internal portion 132 through the first side panel 116.

Additionally, another alternative embodiment may allow the size of the second image 28 projected onto the second wall 16 to be increased or decreased. This change in image size may allow greater adaptation to varying configurations of the room. This adjustment of size of the second image 28 may occur by adjusting various components of the projector 100 to cause the angle of the second projected beam 158 to be varied.

In another alternative embodiment, the first and second projected beams 156, 158 may be directed to third and fourth walls (not shown), respectively, of the room. This configuration may allow the projector 100 to be utilized when the audience is located at pc workstations that obstruct visibility of the first wall 14. When the audience is located at pc workstations, their view of the first wall 14 may be obstructed. to eliminate the obstruction, the projected beams 156, 158 may be directed to other walls in the room.

In another alternative embodiment, the projector 100 may be provided with a port (not shown) for receiving electronic information from which the image is generated. This port may be any type of connection commonly found in computer devices such as, for example, RS-232, infrared receiver, serial connection, high frequency wireless networks (sometimes referred to as wireless fidelity, WiFi) and other wireless protocol networks that are well known to those skilled in the art.

While illustrative embodiments have been described in detail herein, it is to be understood that the concepts may be otherwise variously embodied and employed and that the appended claims are intended to be construed to include such variations except insofar as limited by the prior art.

I claim:

1. A projector comprising:
    a housing defining an interior and an exterior;
    a first projection path extending from said interior to a first surface on said exterior;
    a second projection path extending from said interior to a second surface on said exterior;
    a light source positioned in said interior, said light source capable of creating a first image on said first surface and a second image on said second surface;
    wherein said first projection path is aligned with said light source;
    wherein said second projection path is aligned with said light source; and
    wherein, said first image is larger than said second image.

2. The projector of claim 1 and further comprising:
    a beam splitter positioned in optical communication with said light source, wherein said first projection path is aligned with said light source via said beam splitter; and
    wherein said second projection path is aligned with said light source via said beam splitter.

3. The projector of claim 1 wherein:
    said first projection path is fixed relative to said projector; and
    said second projection path is adjustable relative to said first projection path.

4. The projector of claim 1 wherein said first projection path is transverse to said second projection path.

5. The projector of claim 1 wherein said first projection path is perpendicular to said second projection path.

6. The projector of claim 1 wherein said first projection path is parallel to and oppositely disposed relative to said second projection path.

7. The projector of claim 1 and further comprising: a port for receiving data representative of said image.

8. A method for presenting a visual, said method comprising:
    generating a first visual emitted from a projector along a first projection path;
    generating a second visual emitted from said projector along a second projection path;
    projecting said first visual onto a first wall causing a first image to be formed on said first wall;
    projecting said second visual onto a second wall causing a second image to be formed on said second wall; and
    wherein, said first image is larger than said second image.

9. An apparatus comprising:
    a means for projecting at least a first image and a second image;
    a first projection path extending from said means for projecting; and
    a second projection path extending from said means for projecting, said second projection path being directed in a direction different than said first projection path; and
    wherein said first image is larger than said second image.

* * * * *